(12) United States Patent
Hayashi

(10) Patent No.: US 6,415,137 B1
(45) Date of Patent: Jul. 2, 2002

(54) TRANSMISSION POWER CONTROL APPARATUS

(75) Inventor: Masaki Hayashi, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/377,842

(22) Filed: Aug. 20, 1999

(30) Foreign Application Priority Data

Aug. 27, 1998 (JP) .......................................... 10-242284

(51) Int. Cl.⁷ ................................................ H04B 7/00
(52) U.S. Cl. ........................ 455/70; 455/522; 455/569; 370/335; 714/704; 714/746
(58) Field of Search .............................. 455/522, 569; 714/704, 746, 750, 795, 751, 752

(56) References Cited

U.S. PATENT DOCUMENTS 5,396,516 A * 3/1995 Padovani et al. ........... 375/225
5,896,419 A * 4/1999 Suzuki ....................... 375/219
6,259,928 B1 * 7/2001 Vembu ....................... 455/522
6,272,119 B1 * 8/2001 Kage .......................... 370/335

OTHER PUBLICATIONS

"Interactive Decoding of Binary Block and Convolutional Codes", J. Hagennauer et al., IEEE Transactions on Information Theory, vol. 42, Mar. 1996.

* cited by examiner

Primary Examiner—Daniel Hunter
Assistant Examiner—Alan Gantt
(74) Attorney, Agent, or Firm—Greenblum & Bernstein, P.L.C.

(57) ABSTRACT

The transmission power control apparatus of the present invention detects a data quality after a smaller number of iterations and based on the detected result, performs transmission power control when high quality data transmissions are performed using error correcting codes with iterative decoding performed.

10 Claims, 15 Drawing Sheets

TRANSMISSION POWER CONTROL APPARATUS

BACKGROUND OF THE INVENTION

1. Field of the Invention

The present invention relates to a transmission power control apparatus which controls transmission power to keep a communication quality of user information at a predetermined quality.

2. Description of the Related Art

Conventionally, a mobile radio communication system in which radio communications are performed between a base station and a mobile station is developed and put to practical use. Particularly, a CDMA communication system has advantages that the spectral efficiency and the system capacity are high because a plurality of communication links are available in the same frequency band by identifying each communication link with a respective spreading code.

As illustrated in FIG. 1, base station BS communicates data with mobile stations MS1 and MS2 using respective reverse links and forward links. Information bits transmitted in each communication link are spectrum spread with different spreading codes.

Received levels of communication link signals in the CDMA communication system vary according to time due to a distance between the base station and the mobile station and fading. The interference noise level varies similarly. FIG. 2 illustrates an example of a variation of Signal to Interference Ratio (SIR). In the CDMA radio communication system, the greatest system capacity is obtained when each SIR of both communication link signals is equal to each other. Therefore, base station BS performs transmission power control in order to keep a received level of each communication link signal at the same level.

An example is explained using the reverse link. Base station BS receives a reverse link signal and measures a received SIR. Base station BS further compares the measured result with a reference SIR, and instructs mobile station MS to increase transmission power when the measured result is lower than the reference value, while instructs to decrease transmission power when the measured result is higher than the reference value. The instruction is transmitted to mobile station MS via forward link. The received SIR in base station BS is thus controlled at a value around the reference SIR (High rate transmission power control).

FIG. 3 illustrates an example of a relation between received SIR and communication link Bit Error Rate (hereinafter referred to as BER). The characteristics vary depending on propagation environments such as moving speed. In order to obtain communication link BER of 0.1%, environment A requires reference value A as a reference SIR, and environment B requires reference value B as a reference SIR. Since it is difficult to estimate propagation environments, actually performed is that error detection bits such as CRC are added to user information, and a reception side detects presence of absence of error and measures BER or Frame Error Rate (hereinafter referred to as FER) per a frame. When the measured BER or FER is lower than a predetermined value for a desired communication quality, reference SIR is decreased, and when the measured BER or FER is lower than the predetermined value, reference SIR is increased, in order to keep a communication quality of user information at a predetermined quality (Low rate transmission power control).

On the other hand, a concatenated code, in which a plurality of error correcting codes are combined, is used in high quality data transmissions. FIG. 4 illustrates an exemplary diagram for coding and decoding of the concatenated code obtained by combining convolutional code and Read Solomon (RS) code. A transmission side performs RS coding on user information, further performs convolutional coding on the RS coded data, and then modulates the convolutional coded data to transmit by radio. A reception side performs Viterbi decoding of the convolutional coded data, which is obtained by demodulating received signals, and performs RS decoding of the decode data to obtain the user information.

The reception side performs Viterbi decoding of received convolutional coded data for error correction to obtain data with BER of approximately 10E-4, and further RS decoding of the decoded data for error correction to obtain data with BER of approximately 10E-6.

A following example illustrates the case where user information is transmitted at a data rate of 64 kbps with a quality of approximately BER=10E-6. Since it is difficult to measure BER, FER is measured using error detection code such as CRC. When 1 frame has 100 bits, the number of frames per second is 720 [frames/sec]. Approximately, BER=10E-4 corresponds to FER=10E-3 with error burst characteristics considered. In this case, since 7,200 frames are transmitted for 10 seconds, the number of error frames is approximately 7 for 10 seconds, making it possible to measure FER with accuracy of one digit. When long term transmission power control is performed based on this FER value, a time constant is approximately 10 seconds.

FIG. 5 illustrates a configuration for receiving a concatenated code obtained by combining convolutional code and RS code and then generating a command for transmission power control. SIR measurement section 1 measures SIR of the received signal, while Viterbi decoding section 2 performs Viterbi decoding of the received signal. RS decoding section 4 performs RS decoding of Viterbi decoded CC coded data to output user information.

Further, FER measurement section 3 measures FER of the CC coded data output from Viterbi decoding section 2. Reference SIR control section 5 inputs reference SIR to comparison section 6, while controlling the reference SIR corresponding to FER. Comparison section 6 determines whether transmission power is increased or decreased comparing the reference SIR to measured SIR so as to generate a TPC command.

Since the concatenated code as described above has a 2-stage structure, it is possible to perform the FER measurement at the time Viterbi decoding is finished prior to RS decoding, enabling the time constant to be shortened.

Further, a turbo code is recently paid attention as a code with high error correction capability. The turbo code is summarized in "Iterative Decoding of Binary Block and Convolutional Codes" by J. Hagenauer et al. (IEEE TRANSACTION ON INFORMATION THEORY, Vol.42, No.2, March 1996).

FIG. 6 illustrates a schematic configuration of a turbo decoder, to which a received signal is input and from which a decoding result of soft value is output. The turbo decoder calculates communication path value (1), previous likelihood (2), and external information likelihood (3), and outputs a sum of (1), (2) and (3). In the first decoding, the previous likelihood is set at 0. From the second decoding, the previous likelihood is updated to previous external information likelihood and the same calculation is performed. Such processing is iterated corresponding to the predetermined number of iterations, while the output is updated. FIG. 7 illustrates an example of BER when the iterative decoding is performed. As can be seen from FIG. 7, BER is decreased as the decoding is performed iteratively even when SIR is the same.

FIG. 8 illustrates a configuration for receiving the turbo code and then generating a command for transmission power control. SIR measurement section 11 measures SIR of the received signal, while turbo decoding section 12 performs iterative decoding of the received signal. The decoding result obtained after a predetermined number of iterations, which times a desired FER is obtained, is output as user information.

Further, FER measurement section 13 receives the decoding result output from turbo decoding section 12 as the user information to measure FER. Reference SIR control section 14 inputs the reference SIR to comparison section 15, while controlling the reference SIR corresponding to FER. Comparison section 15 determines whether transmission power is increased or decreased comparing the reference SIR to a measured SIR so as to generate a TPC command.

FIG. 9 illustrates an exemplary diagram for coding and decoding of the turbo code. In the case of using one kind of error correcting code such as a turbo code, a bit rate is decreased from 192 kbps to 64 kbps by one step according to the turbo decoding, not by multiple steps stepwisely, at a reception side. FER is measured from the signal with a bit rate of 64 kbps.

However, in the case of using one kind of error correcting code such as the turbo code not a concatenated code, a time constant for long term (low rate) transmission power control becomes long, thereby remains the problem that it is difficult to keep stable communication quality of user information.

A specific example is explained in the case of measuring a quality of user information data. Assume that FER is 10E-4 when BER is approximately 10E-6, and that 1 frame has 300 bits. The number of frames per 10 seconds is 2133, and the number of error frames per 10 seconds is 0.2 as an average value. However, since the number of error frames takes an integer number, the average value for 10 seconds is replaced with 0 in this case, or 1, 2 or etc., resulting in a great error between an actual average value and a quantized value. Therefore, it is difficult to measure FER with accuracy of one digit, and several hundred seconds are necessary to measure FER with accuracy of one digit. In other words, several hundred seconds are necessary as a time constant to perform the long term transmission power control based on FER in the case of using the turbo code. When a time constant is long, it may take a long time to detect a variation after a communication path propagation environment varies. It is thereby difficult to keep stable communication qualities.

SUMMARY OF THE INVENTION

An object of the present invention is to provide a transmission power control apparatus capable of keeping communication qualities of user information stably without extending a time constant for long term transmission power control even when a single kind of error correcting code such as a turbo code is used.

The present invention provides a transmission power control apparatus which detects a data quality after a smaller number of decoding iteration times, and based on the detected quality, performs transmission power control when a high quality data transmission is performed using an error correcting code with the iterative decoding performed.

According to the aforementioned apparatus, it is possible to keep communication qualities of user information stably without extending a time constant for long term transmission power control even when a single kind of error correcting code such as the turbo code is used.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described below using FIG. 10 to FIG. 15.

First Embodiment

Figure 10:
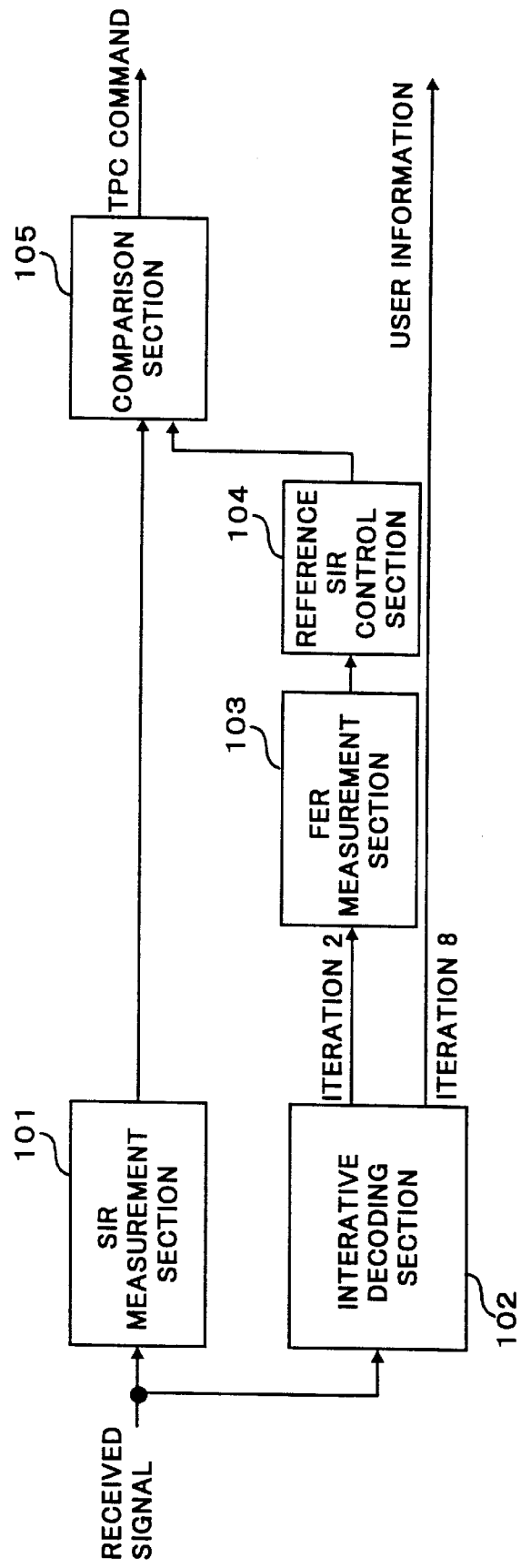
FIG. 10 is a block diagram illustrating a configuration of a transmission/reception apparatus according to a first embodiment of the present invention.

FIG. 10 illustrates a configuration of a transmission/reception apparatus for transmission power control. This transmission/reception apparatus has SIR measurement section 101 for measuring Signal to Interference Ratio (SIR) of a received signal, iterative decoding section 102 for the turbo code, FER measurement section 103 for measuring Frame Error Rate (FER), reference SIR control section 104 for controlling a reference SIR, and comparison section 105 for comparing a measured SIR to the reference SIR.

Operations in the transmission/reception apparatus configured as described above is explained.

A received signal is allotted to be input to SIR measurement section 101 and iterative decoding section 102.

SIR measurement section 101 measures the SIR based on the input received signal. For example, in the case of CDMA communication, the SIR measurement is performed using correlation value of a received signal with a spreading code or a variance of correlation values of a plurality of symbols. The measured result is input to comparison section 105.

Iterative decoding section 102 performs the iterative decoding of the input received signal. For example, in the case where the maximum number of iterationss is 8, iterative decoding section 102 outputs a decoding result obtained after 8 iterations as user information, while outputs a decoding result obtained after a smaller number of iterationss than 8, for example, 2 iterations, to FER measurement section 103.

FER measurement section 103 detects presence or absence of error in a frame using an error detection code such as CRC to measure FER. Reference SIR control section 104 controls the reference SIR based on the measured FER. Specifically, reference SIR control section 104 increases the reference SIR when the FER is larger than a desired value (a large number of errors), while decreases the reference SIR when the FER is smaller than the desired value (a small number of errors).

Comparison section 105 compares the measured SIR to the controlled reference SIR, and controls the TPC (Transmission Power Control) command to be transmitted to a transmission apparatus side in a link that is opposite to the link in which the SIR is measured. Comparison section 105 generates the TPC command to increase the transmission power when the measured SIR is lower than the reference SIR, while generates the TPC command to decrease the transmission power when the measured SIR is higher than the reference SIR.

Figure 11:
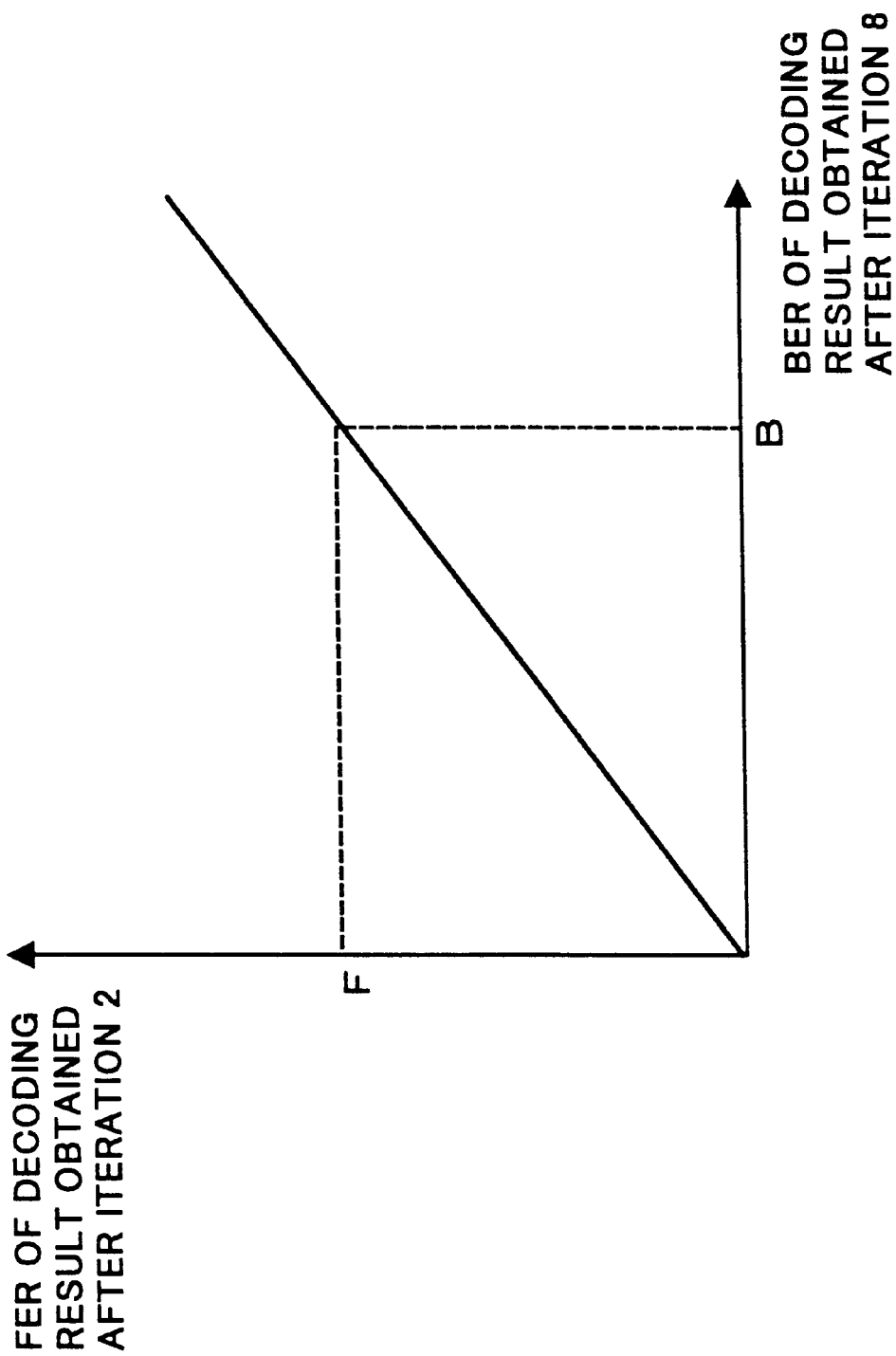
FIG. 11 is a diagram illustrating a relation between FER of decoding result obtained after iteration 2 and BER of decoding result obtained after iteration 8 in the first embodiment.

FIG. 11 illustrates a relation between the BER of decoding result obtained after iteration 8 and the FER of decoding result obtained after iteration 2. Assume that B is a desired BER value which satisfies a required communication quality of user information and the required communication quality should be achieved after iteration 8, and further assume that the BER of decoding result obtained after iteration 8 is B and corresponding FER of decoding result obtained after iteration 2 is F.

In this case, reference SIR control section 104 adopts F as a desired FER value. The transmission power is thereby controlled so that the FER of decoding result obtained after iteration 2 approaches to F, and thus the BER of decoding result obtained after iteration 8 can be controlled to approach to B.

Figure 1:
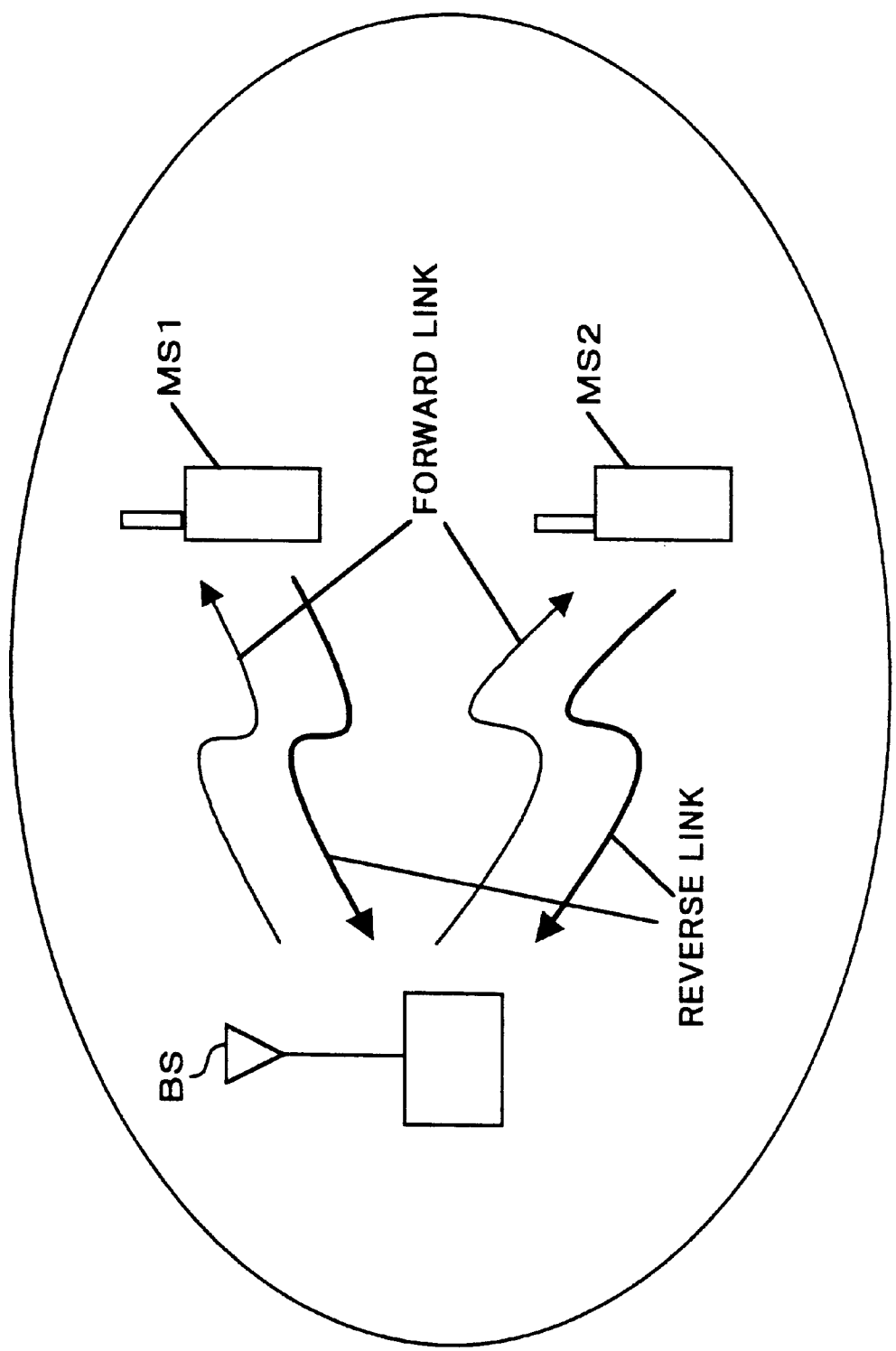
FIG. 1 is a schematic diagram of a mobile radio communication system.
Figure 2:
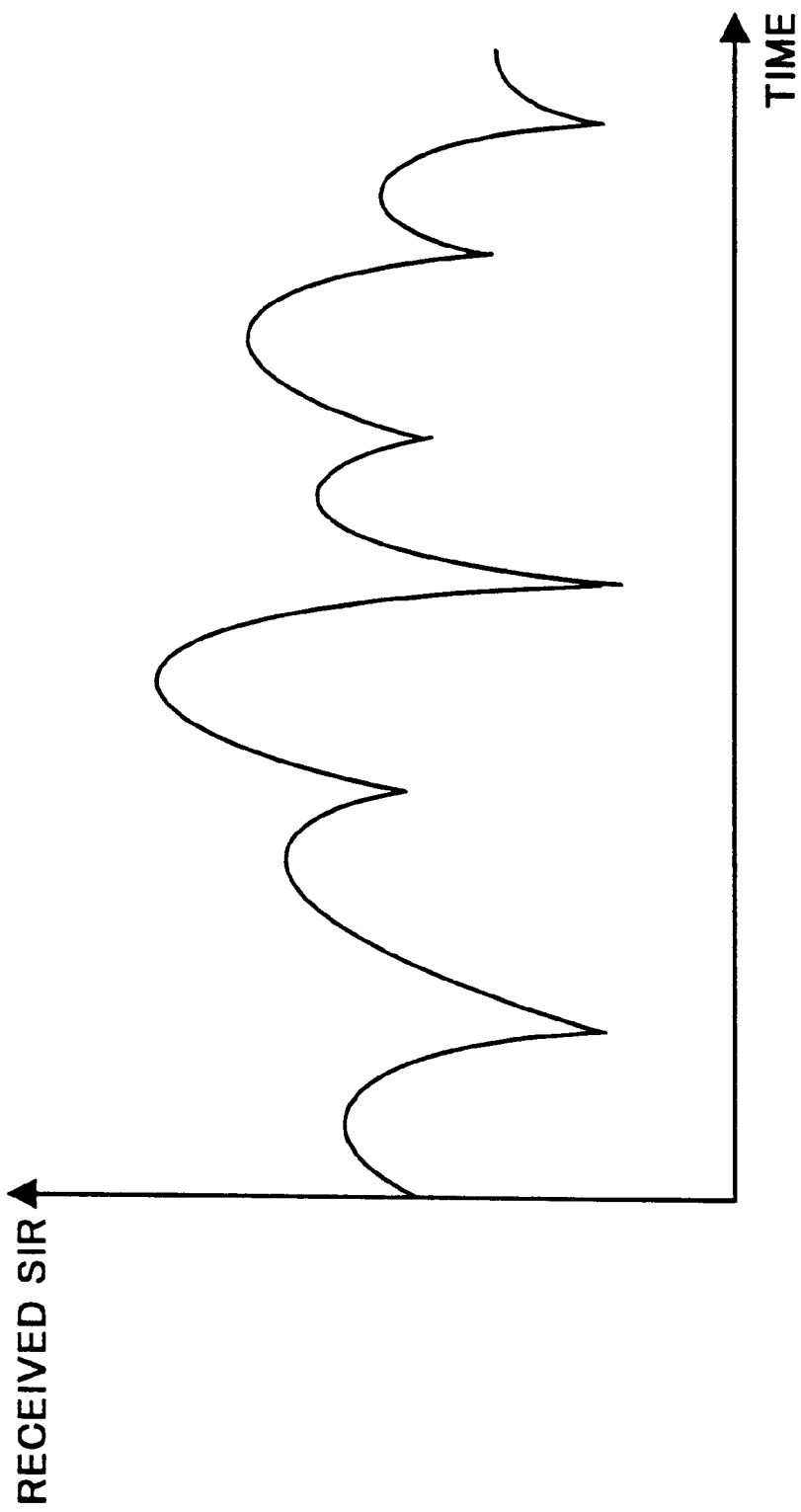
FIG. 2 is a diagram illustrating a variation of SIR in the CDMA communication system.
Figure 3:
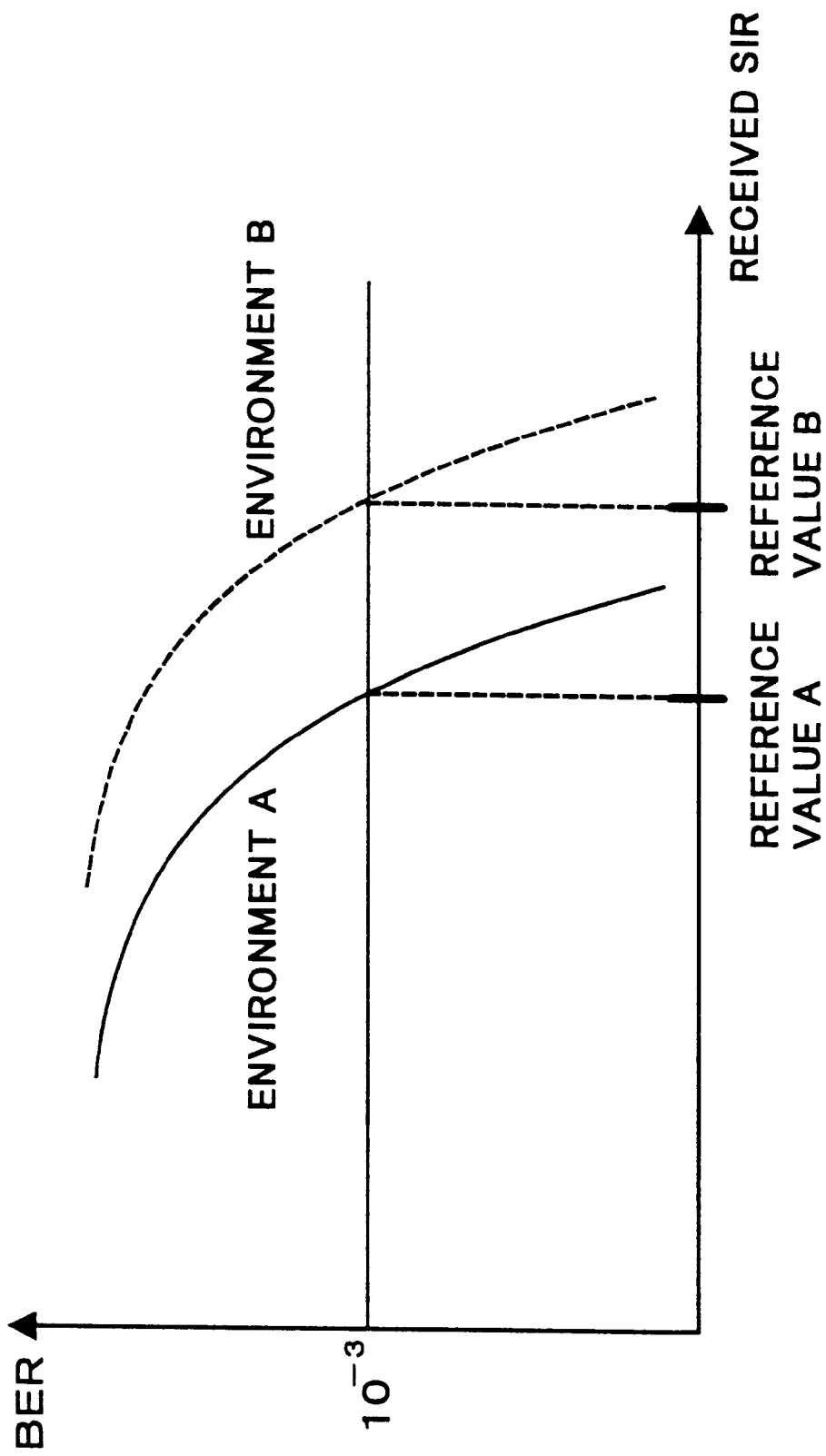
FIG. 3 is a diagram illustrating a relation between BER and received SIR.
Figure 4:
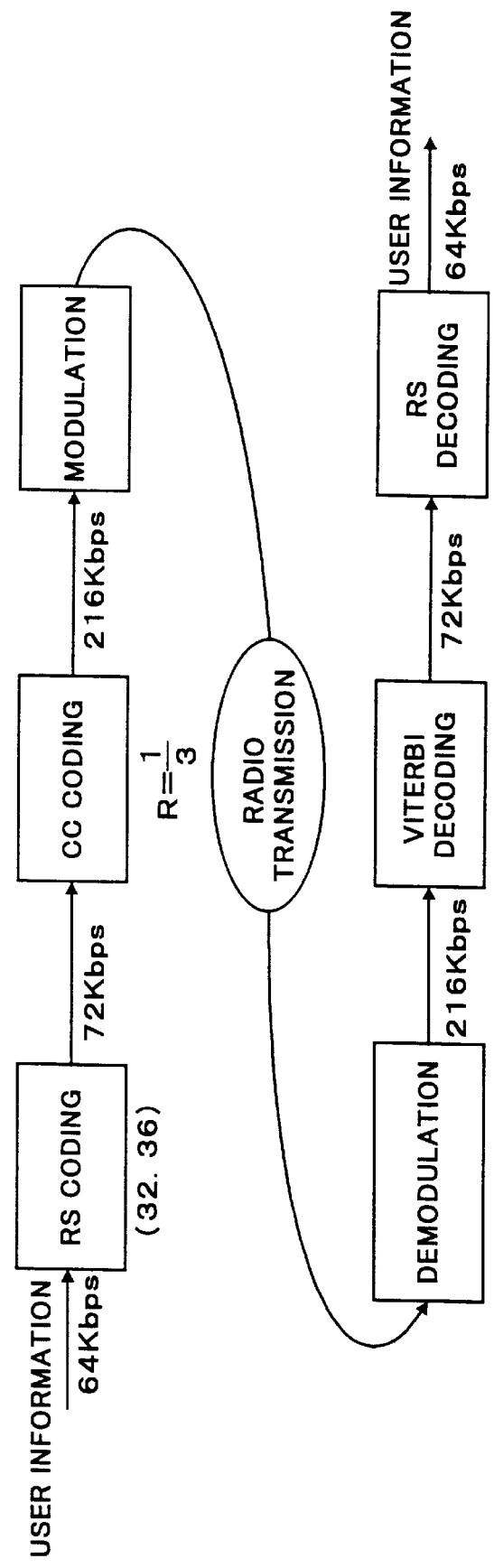
FIG. 4 is a diagram illustrating a flow for coding and decoding of concatenated code.
Figure 5:
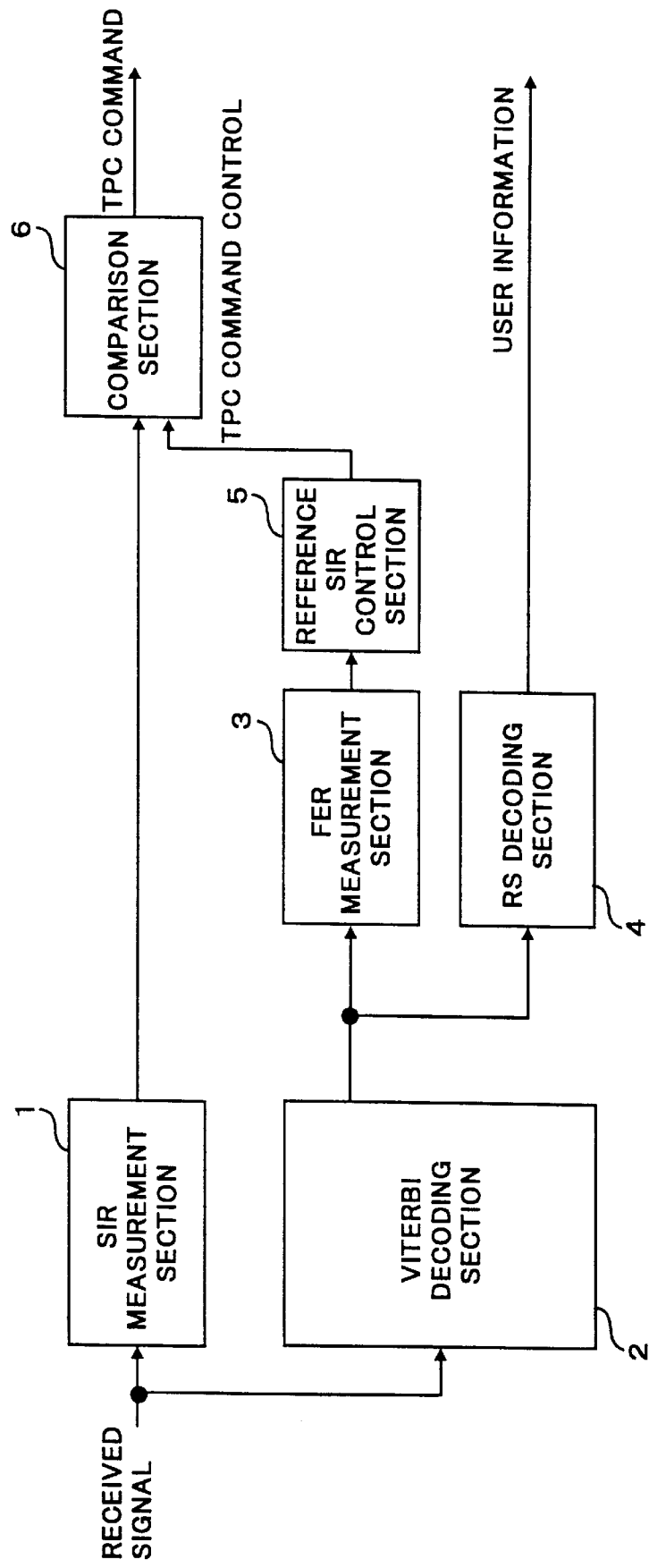
FIG. 5 is a block diagram to explain a function of decoding a concatenated code.
Figure 6:
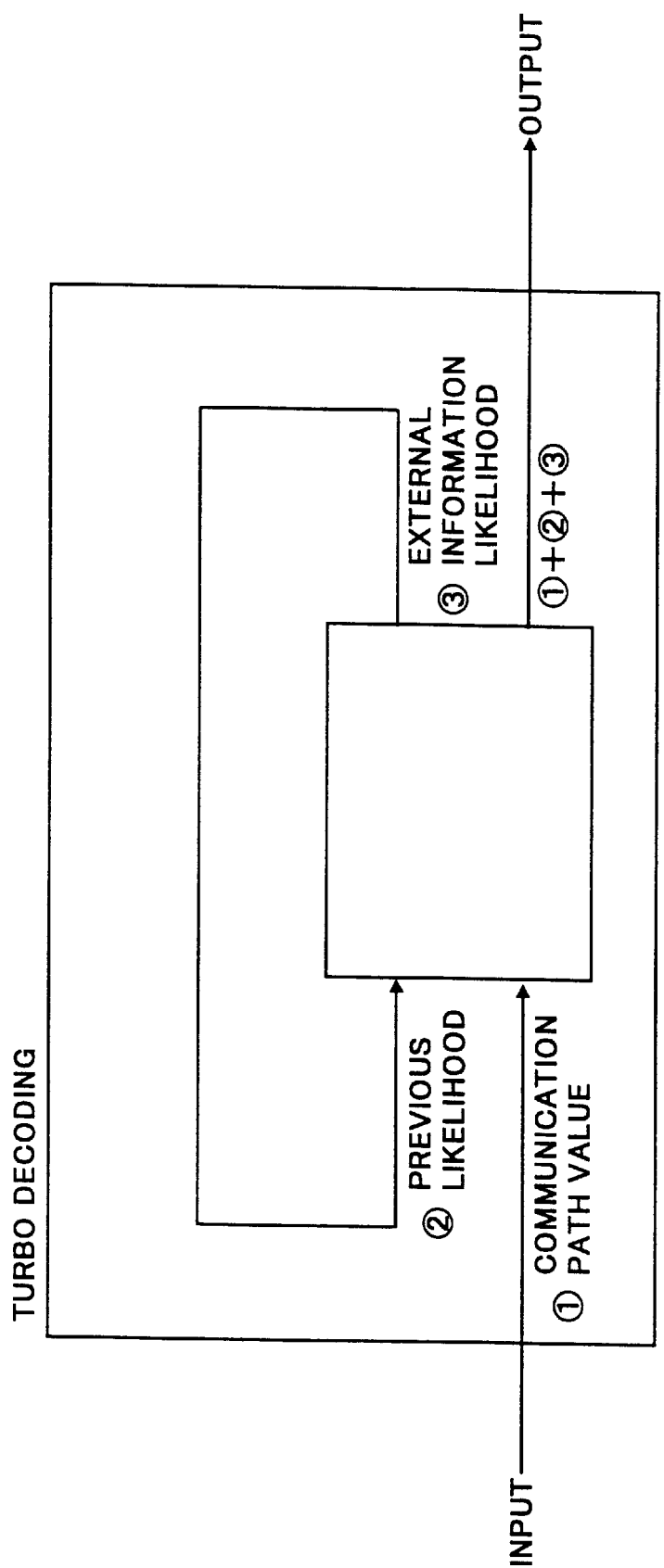
FIG. 6 is a schematic diagram of turbo decoder.
Figure 7:
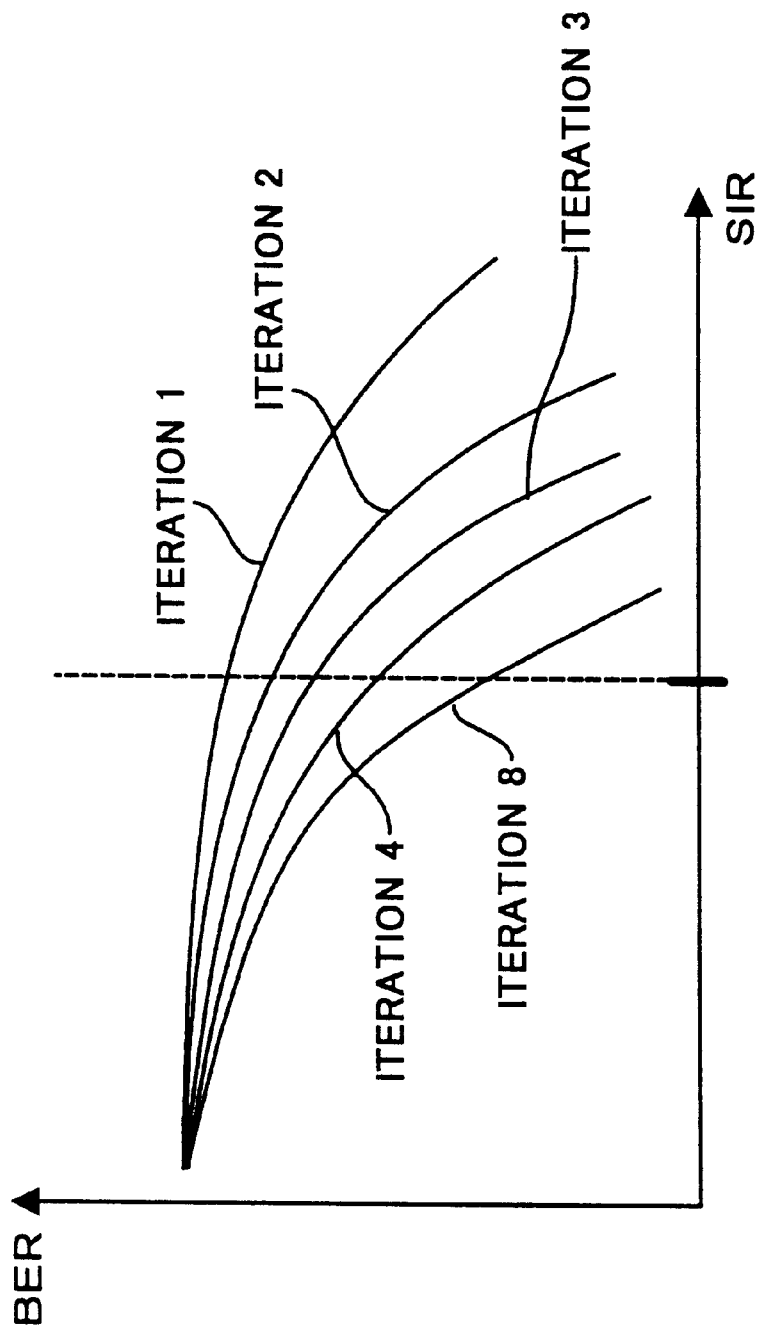
FIG. 7 is a diagram illustrating BER when an iterative decoding is performed.
Figure 8:
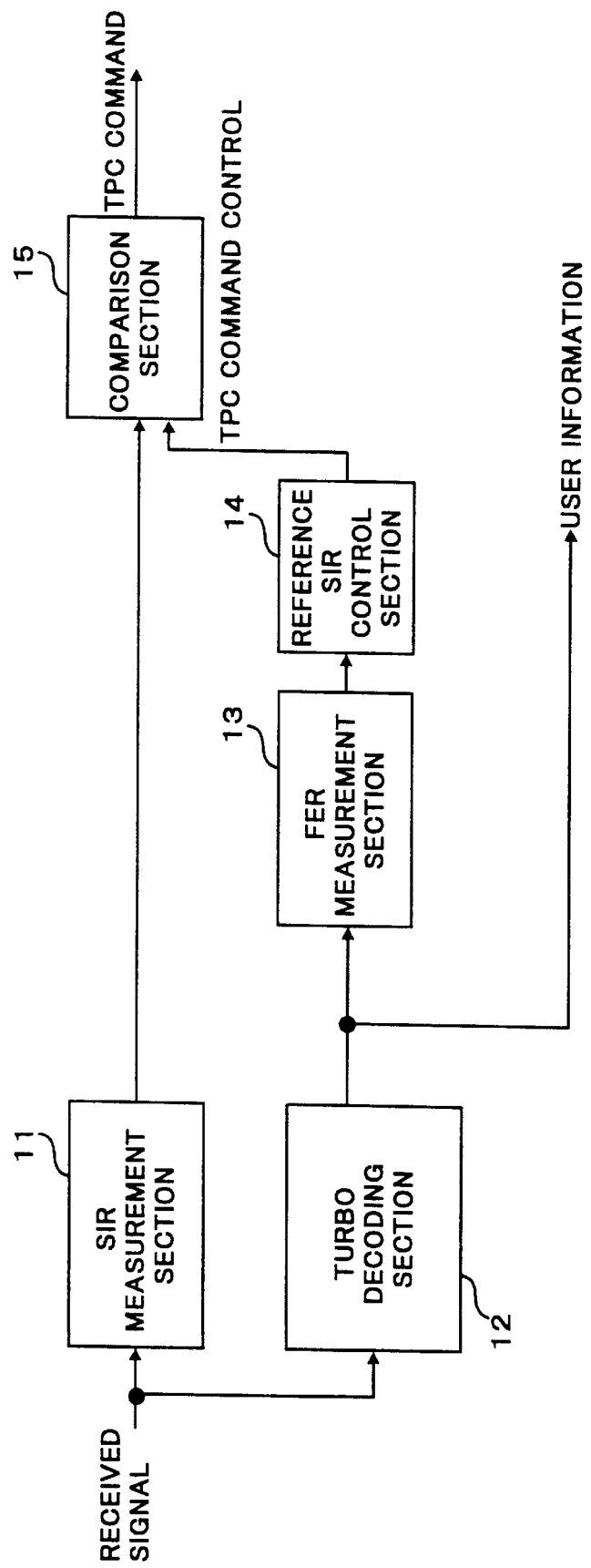
FIG. 8 is a block diagram to explain a function of decoding the turbo code.
Figure 9:
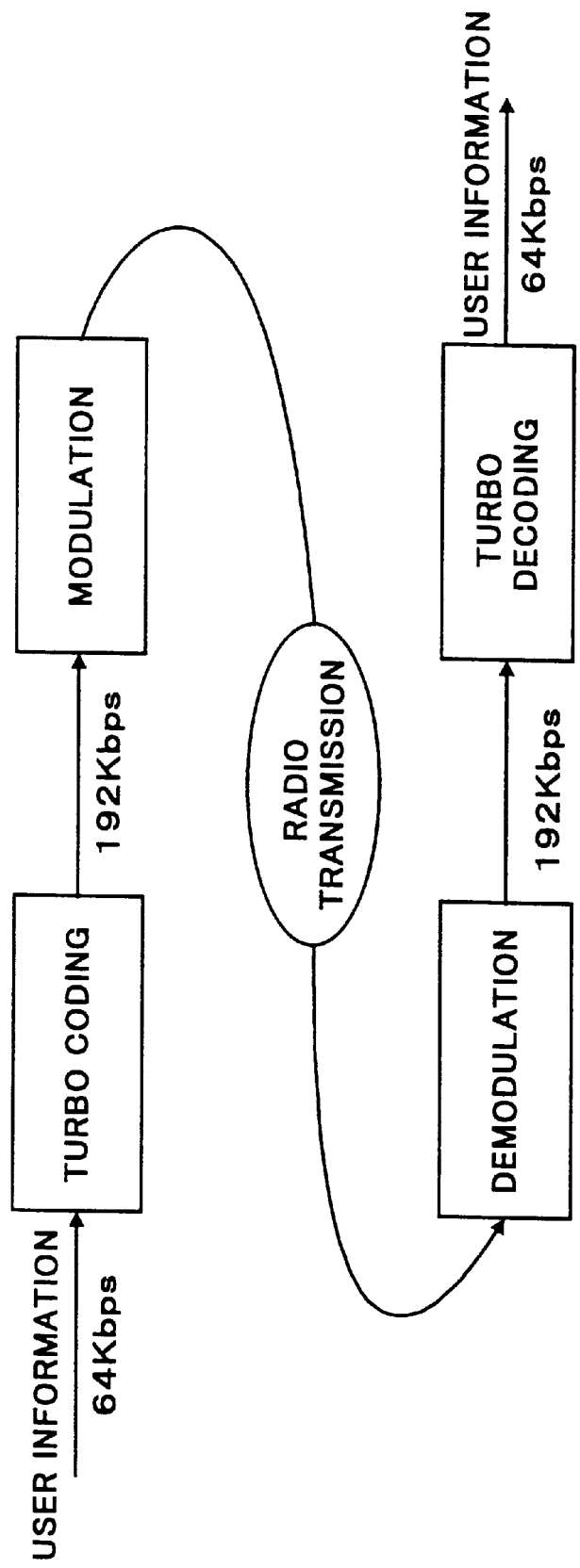
FIG. 9 is a diagram illustrating a flow for coding and decoding the turbo code.

In the case of an example illustrated in FIG. 6, assume that the BER Of decoding result obtained after iteration 8 is controlled to be about 10E-6 and the corresponding FER is about 10E-4, and further assume that the FER of decoding result obtained after iteration 2 in this case is 10E-2 (F=10E-2). In the case where 1 frame has 300 bits, 2,133 frames are obtained for 10 seconds. When it is assumed that errors occur in 1% (10E-2) of 2133 frames, the number of error frames is about 20. In this case, it is possible to measure FER with accuracy of one digit. In other words, it is possible to obtain a time constant of about 10 seconds for the control of reference SIR.

According to this embodiment, since FER is measured using the decoding result obtained after the predetermined number of iterations (2 in this embodiment) which is achieved faster than the number of iterations (8 in this embodiment) after which a required communication quality of user information is achieved, even in the case where a single kind of error correcting code such as the turbo code is used, it is possible to perform the long term transmission power control with a short time constant, thus enabling high transmission quality of user information data to kept stably.

In addition, the above description explains about an example constructed using an iteration code such as the turbo code, and further in the case where a code constructed in such a manner that a quality is improved as calculations are proceeded is used, it may be possible to practice the present invention similarly by performing a long term control based on a quality obtained before all calculations are finished.

Further, the above description explains about an example using FER as a reference of quality used in the long term control, and it may be possible to practice the present invention similarly in the case where the other reference such as BER is used.

Furthermore, the number of iterations in the turbo code are not limited to 2 or 8, and it may be possible to practice the present invention similarly in the case where the other numbers are used. Also, the other values such as a user information rate are not limited to those used in this embodiment, and it may be possible to practice the present invention similarly in the case where the other values are used.

Second Embodiment

Figure 12:
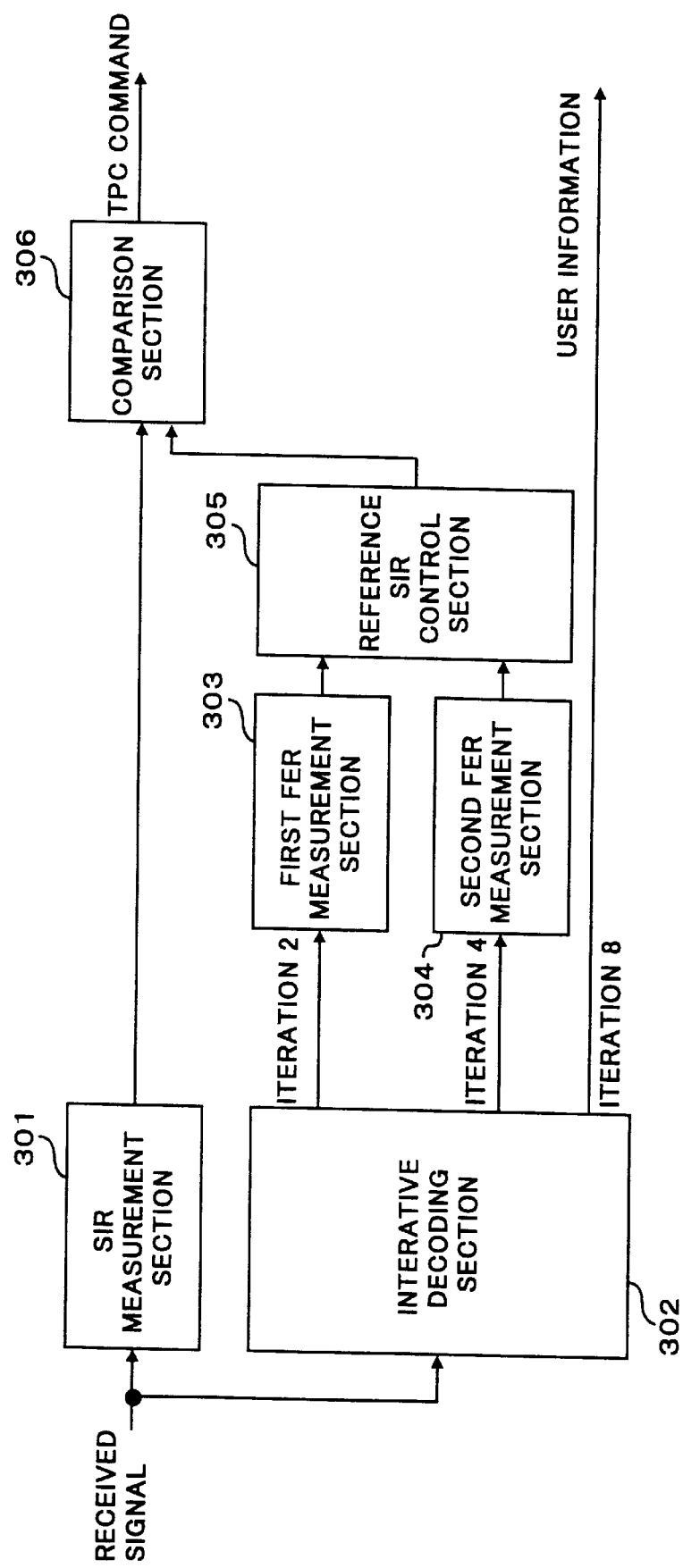
FIG. 12 is a block diagram illustrating a configuration of a transmission/reception apparatus according to a second embodiment.

FIG. 12 illustrates a configuration of a transmission/reception apparatus for transmission power control. This transmission/reception apparatus has SIR measurement section 301 for measuring Signal to Interference Ratio (SIR) of a received signal, iterative decoding section 302 for turbo code, first FER measurement section 303 for measuring Frame Error Rate (FER), second FER measurement section 304 for measuring FER, reference SIR control section 305 for controlling a reference SIR, and comparison section 306 for comparing the measured SIR to the reference SIR.

Operations in the transmission/reception apparatus configured as described above is explained.

A received signal is allotted to be input to SIR measurement section 301 and iterative decoding section 302. SIR measurement section 301 measures the SIR based on the input received signal. The measured result is input to comparison section 306.

Iterative decoding section 302 performs iterative decoding of the input received signal. For example, in the case where the maximum number of iterations is 8, iterative decoding section 302 outputs a decoding result obtained after iteration 8 as user information. Further, on the way to iteration 8, iterative decoding section 302 outputs, for example, a decoding result obtained after iteration 2 to first FER measurement section 303, and a decoding result obtained after iteration 4 to second FER measurement section 304.

First and second FER measurement sections 303 and 304 detect presence or absence of error in a frame using an error detection code such as CRC, and respectively measure the FER of decoding result obtained after iteration 2 and the FER of decoding result obtained after iteration 4. Reference SIR control section 305 controls the reference SIR based on the measured two FER values.

Generally, the FER of decoding result obtained after iteration 2 is larger than the FER of decoding result obtained after iteration 4. Further, the correlation between the quality (BER) of decoding result obtained after iteration 8 and the FER of decoding result obtained after iteration 4 is higher than the correlation between the quality (BER) of decoding result obtained after iteration 8 and the FER of decoding result obtained after iteration 2.

Figure 15:
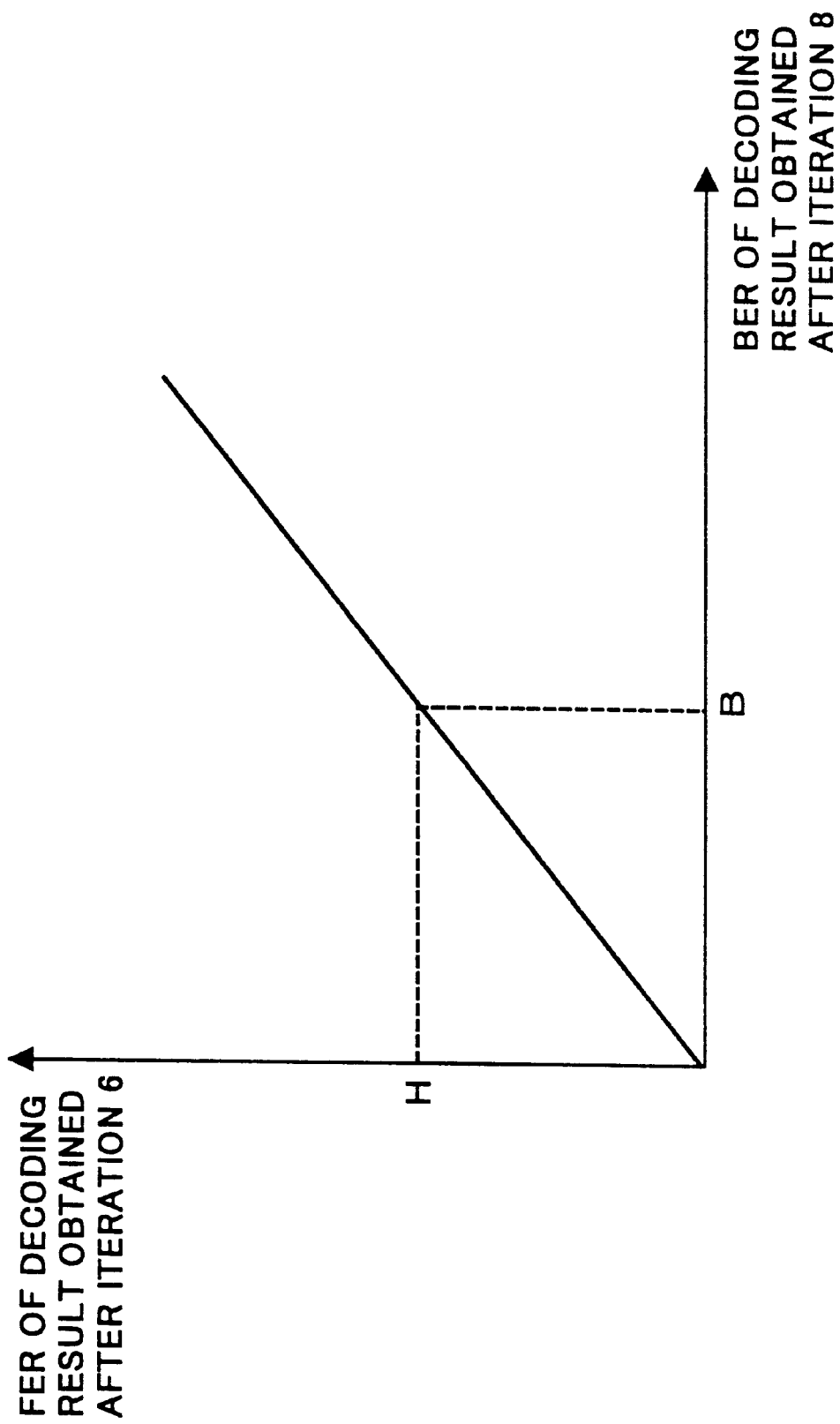
FIG. 15 is a diagram illustrating a relation between FER of decoding result obtained after iteration 6 and BER of decoding result obtained after iteration 8 in the third embodiment.

In the case of an example illustrated in FIG. 15, assume that the BER of decoding result obtained after iteration 8 is controlled to be about 10E-6 and the corresponding FER is about 10E-4, and further assume that in this case, the FER of decoding result obtained after iteration 2 is 10E-2, and the FER of decoding result obtained after iteration 4 is 10E-3. In the case where 1 frame has 300 bits, 2,133 frames are obtained for 10 seconds. When it is assumed that errors occur in 1% (10E-2) of 2133 frames, the number of error frames in the decoding result obtained after iteration 2 is about for 10 seconds. In this case, it is possible to measure FER with accuracy of one digit.

Further, in the case where 1 frame has 300 bits, 21,333 frames are obtained for 100 seconds. When it is assumed that errors occur in 0.1% (10E-3) of 21,333 frames, the number of error frames in the decoding result obtained after iteration 4 is about 20 for 100 seconds. In this case, it is also possible to measure FER with accuracy of one digit. With respect to the FER of decoding result obtained after iteration 2, the measurement time is 10 seconds, which is relatively short, however, the correlation with the BER of decoding result of iteration 8 is low. With respect to the FER of decoding result obtained after iteration 4, the measurement time is 100 seconds, which is relatively long, however, the correlation with the BER of decoding result of iteration 8 is high.

FIG. 11 illustrates a relation between the BER of decoding result obtained after iteration 8 and the FER of decoding result obtained after iteration 2. Assume that B is a desired BER value which satisfies a required communication quality of user information and the required communication quality should be achieved after 8 iteration times, and further assume that the BER of decoding result obtained after iterations 8 is B and the corresponding FER of decoding result obtained after iteration 2 is F.

Using F as a desired FER value, reference SIR control section 305 increases the reference SIR when the FER of decoding result obtained after iteration 2 is larger than the desired value F, while decreases the reference SIR when the FER is smaller than the desired value F.

Comparison section 306 compares the measured SIR to the reference SIR, and controls the TPC (Transmission Power Control) command to be transmitted to a transmission apparatus side in a link that is opposite to the link in which the SIR is measured. Comparison section 305 generates the TPC command to increase the transmission power when the measured SIR is lower than the reference SIR, while generates the TPC command to decrease the transmission power when the measured SIR is higher than the reference SIR.

It is thus possible to perform the long term transmission power control using a short time constant. However, since the correlation between the FER of decoding result obtained after iteration 2 and the BER of decoding result obtained after iteration 8 is not high so much, the BER of decoding result obtained after iteration 8 sometimes differs from a desired value.

Figure 13:
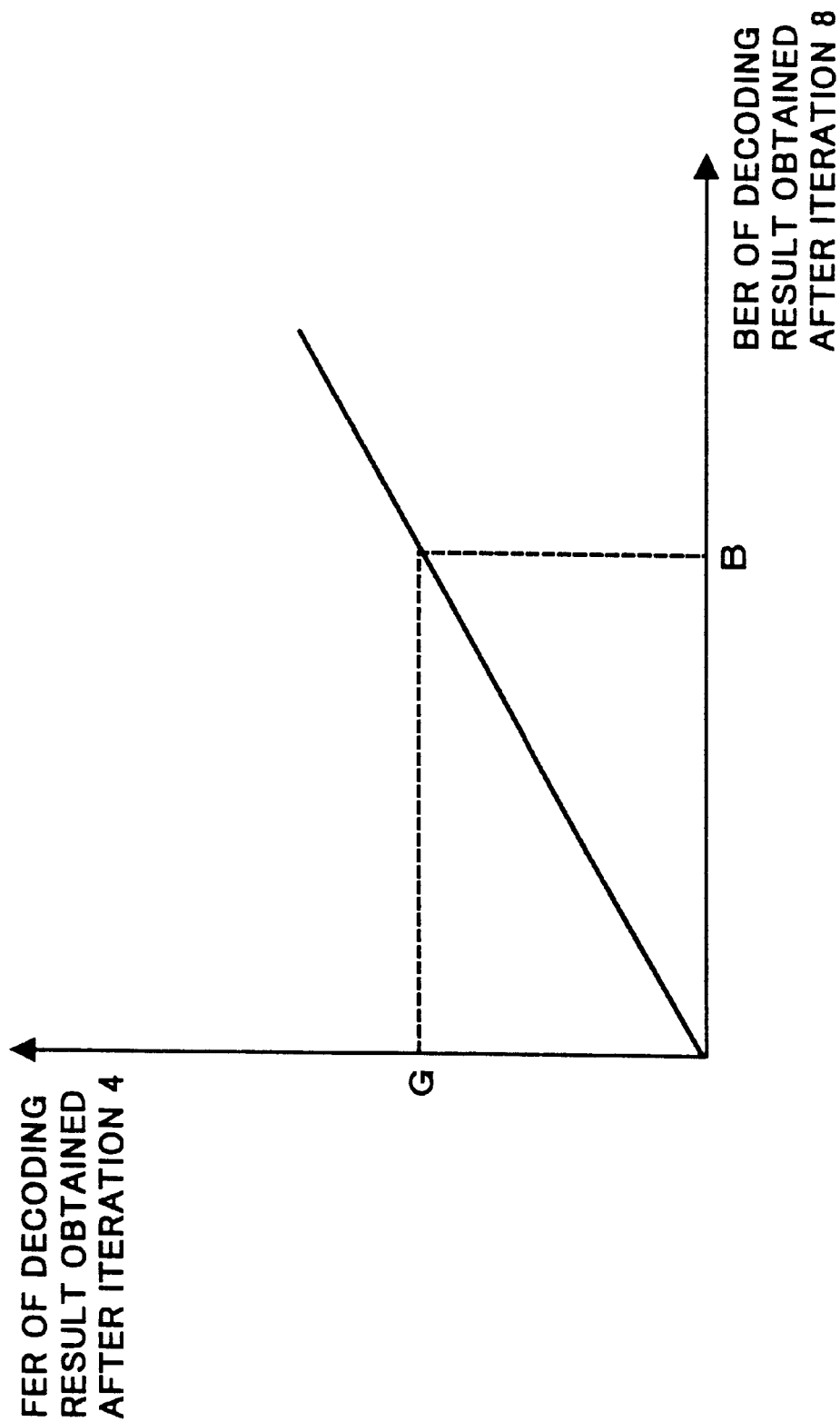
FIG. 13 is a diagram illustrating a relation between FER of decoding result obtained after iteration 4 and BER of decoding result obtained after iteration 8 in the second embodiment.

In such a case, the desired value F of the FER of decoding result obtained after iteration 2 is controlled based on the FER of decoding result obtained after iteration 4. FIG. 13 illustrates a relation between the BER of decoding result obtained after iteration 8 and the FER of decoding result obtained after iteration 4. Assume that B is a desired BER value which satisfies a required communication quality of user information and the required communication quality should be achieved after iteration 8, and further assume that the BER of decoding result obtained after iterations 8 is B and the corresponding FER of decoding result obtained after iteration 4 is G.

Using G as a desired value of the FER of decoding result after iteration 4, reference SIR control section 305 decreases the reference value F for the FER of decoding result obtained after iteration 2 when the FER of decoding result obtained after iteration 4 is larger than the desired value G, while increases the reference value F for the FER of decoding result obtained after iteration 2 when the FER is smaller than the desired value G.

According to this embodiment, since the reference value F for the FER of decoding result obtained after iteration 2 is controlled based on the FER of decoding result obtained after iteration 4 which has the high correlation with the quality of decoding result after iteration 8, it is possible to control the BER of decoding result obtained after iteration 8 adaptively to further approach to B. Accordingly, it is possible to correct the reference value adaptively, thereby making it possible to perform transmission power control based on a data quality which has higher correlation with the data quality of the data that is decoded finally as user information.

Third Embodiment

Figure 14:
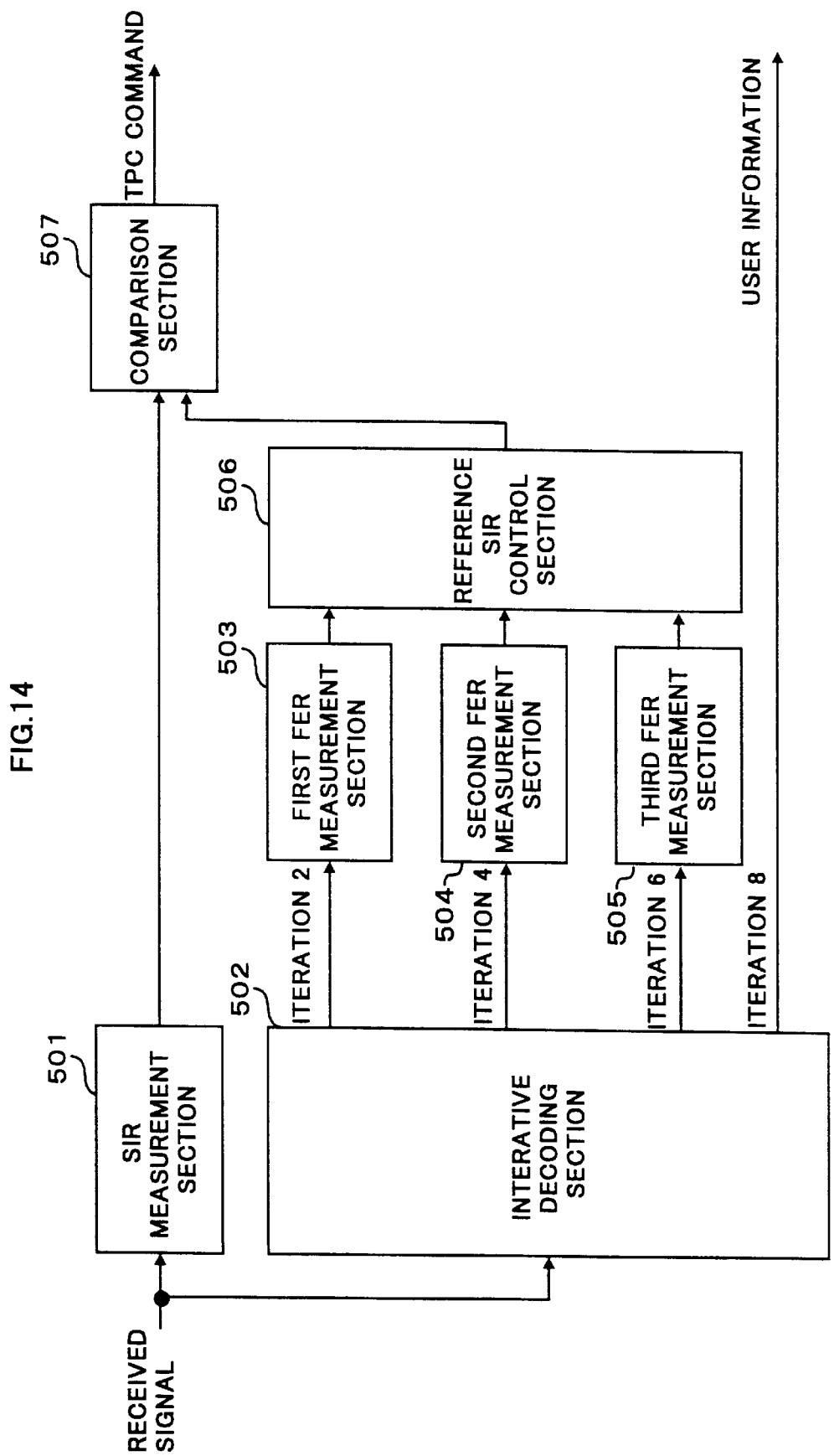
FIG. 14 is a block diagram illustrating a configuration of a transmission/reception apparatus according to a third embodiment.

FIG. 14 illustrates a configuration of a transmission/reception apparatus for transmission power control. This transmission/reception apparatus has SIR measurement section 501 for measuring Signal Interference Ratio (SIR) of a received signal, iterative decoding section 502 for turbo code, first to third FER measurement sections 503 to 505 each for measuring Frame Error Rate (FER) after a respective different number of iterations, reference SIR control section 506 for controlling a reference SIR, and comparison section 507 for comparing the measured SIR to the reference SIR.

Operations in the transmission/reception apparatus configured as described above is explained.

A received signal is allotted to be input to SIR measurement section 501 and iterative decoding section 502. Iterative decoding section 502 performs iterative decoding of the input received signal. For example, in the case where the maximum number of iterations is 8, iterative decoding section 502 outputs a decoding result obtained after iteration 8 as user information. Further, on the way to iteration 8, iterative decoding section 502 outputs, for example, a decoding result obtained after iteration 2 to first FER measurement section 503, a decoding result obtained after iteration 4 to second FER measurement section 504, and a decoding result obtained after iteration 6 to FER measurement section 505. First to third FER measurement sections 503 to 505 detect presence or absence of error in a frame using an error detection code such as CRC, and respectively measure the FER of decoding result obtained after iteration 2, the FER of decoding result obtained after iteration 4, and the FER of decoding result obtained after iteration 6. Reference SIR control section 506 controls the reference SIR based on the measured three FER values.

Generally, the FER of decoding result obtained after iteration 2 is larger than the FER of decoding result obtained after iteration 4, and the FER of decoding result obtained after iteration 4 is larger than the FER of decoding result obtained after iteration 6. Further, the correlation with the quality (BER) of decoding result obtained after iteration 8 is increased as the number of iterations is increased. In this case, the FER of decoding result obtained after iteration 6 has the highest correlation, and the FER of decoding result obtained after iteration 4 has higher correlation than the FER of decoding result obtained after iteration 2 which has the lowest correlation.

In the case of an example illustrated in FIG. 6 assume that the BER of decoding result obtained after iteration 8 is controlled to be about 10E-6 and the corresponding FER is about 10E-5, and further assume that in this case, the FER of decoding result obtained after iteration 2 is 10E-2, the FER of decoding result obtained after iteration 4 is 10E-3, and the FER of decoding result obtained after iteration 6 10E-4. In the case where 1 frame has 300 bits, 2,133 frames are obtained for 10 seconds. When it is assumed that errors occur in 1% (10E-2) of 2,133 frames, the number of error frames in the decoding result obtained after iteration 2 is about for 10 seconds. In this case, it is possible to measure FER with accuracy of one digit. Further, in the case where 1 frame has 300 bits, 21,333 frames are obtained for 100 seconds. When it is assumed that errors occur in 0.1% (10E-3) of 21,333 frames, the number of error frames in the decoding result obtained after iteration 4 is about 20 for 100 seconds. In this case, it is also possible to measure FER with accuracy of one digit. Furthermore, in the case where 1 frame has 300 bits, 213,333 frames are obtained for 1,000 seconds. When it is assumed that errors occur in 0.01% (10E-4) of 21,333 frames, the number of error frames in the decoding result obtained after iteration 6 is about 20 for 1,000 seconds. In this case, it is also possible to measure FER with accuracy of one digit.

With respect to the FER of decoding result obtained after iteration 2, the measurement time is 10 seconds, which is relatively short, however, the correlation with the BER of decoding result of iteration 8 is low. With respect to the FER of decoding result obtained after iteration 6, the measurement time is 1,000 seconds, which is relatively long, however, the correlation with the BER of decoding result of iteration 8 is high. With respect to the FER of decoding result obtained after iteration 4, the aforementioned characteristics are intermediate between those of the two FER values.

As illustrated in FIG. 15, assume that B is a desired BER value which satisfies a required communication quality of user information and B should be achieved after iteration 8, and the corresponding FER of decoding result obtained after iteration 2 is F. Using F as a desired FER value, reference SIR control section 506 increases the reference SIR when the FER of decoding result obtained after iteration 2 is larger than the desired value F, while decreases the reference SIR when the FER is smaller than the desired value F. Comparison section 507 compares the measured SIR to the reference SIR, and controls the TPC (Transmission Power Control) command to be transmitted to a transmission apparatus side in a link that is opposite to the link in which the SIR is measured. Comparison section 507 generates the TPC command to increase the transmission power when the measured SIR is lower than the reference SIR, while generates the TPC command to decrease the transmission power when the measured SIR is higher than the reference SIR.

Further, the desired value F of the FER of decoding result obtained after iteration 2 is controlled based on the FER of decoding result obtained after iteration 4. As illustrated in FIG. 13, assume that B is a desired BER value which satisfies a required communication quality of user information and B should be achieved after iteration 8, and the corresponding FER of decoding result obtained after iteration 4 is G. Using G as a desired value of the FER of decoding result after iteration 4, reference SIR control section 506 decreases the reference value F for the FER of decoding result obtained after iteration 2 when the FER of decoding result obtained after iteration 4 is larger than the desired value G, while increases the reference value F for the FER of decoding result obtained after iteration 2 when the FER is smaller than the desired value G.

Furthermore, the desired value G of the FER of decoding result obtained after iteration 4 is controlled based on the FER of decoding result obtained after iteration 6. FIG. 15 illustrates a relation between the BER of decoding result obtained after iteration 8 and FER of decoding result obtained after iteration 6. Assume that B is a desired BER value which satisfies a required communication quality of user information and B should be achieved after iteration 8, and the corresponding FER of decoding result obtained after iteration 6 is H. Using H as a desired value of the FER of decoding result after iteration 6, reference SIR control section 506 decreases the reference value G for the FER of decoding result obtained after iteration 4 when the FER of decoding result obtained after iteration 6 is larger than the desired value H. while increases the reference value G for the FER of decoding result obtained after iteration 4 when the FER is smaller than the desired value H.

As described above, according to this embodiment, since the reference value G for the FER of decoding result obtained after iteration 4 is controlled based on the FER of decoding result obtained after iteration 6 which has higher correlation with the quality of decoding result after iteration 8, and thus the reference value F for the FER of decoding result after iteration 2 is controlled, it is possible to control the BER of decoding result obtained after iteration 8 adaptively to further approach to B.

Thus, even when a single kind of error correcting code is used, it is possible to perform the long term transmission power control using a short time constant and also to improve the control accuracy, thereby enabling high transmission qualities of user information to be kept stably.

In addition, the above description explains about an example constructed using an iteration code such as the turbo code, and further in the case where a code constructed in such a manner that a quality is improved as calculations are proceeded is used, it may be possible to practice the present invention similarly by performing a long term control based on a quality obtained before all calculations are finished.

Further, the above description explains about an example using FER as a reference for quality used in the long term control, and it may be possible to practice the present invention similarly in the case where the other reference such as BER is used. Also, SIR is used in the above description as a reference for quality used in a short term control, and it may be possible to practice the present invention similarly using the other reference.

Furthermore, the number of iterations in the turbo code are not limited to 2, 4 or 8, and it may be possible to practice the present invention similarly in the case where the other numbers are used. Also, the other values such as a user information rate are not limited to those used in this embodiment, and it may be possible to practice the present invention similarly in the case where the other values are used.

In addition, the aforementioned description explains about the second embodiment in which the iterative decoding section outputs three kinds of decoding results obtained respectively after iterations 2, 4, and 8. It may be also possible to practice the present invention similarly using two kinds of decoding results obtained respectively after iterations 2 and 8. In this case, the FER of decoding result obtained after iteration 8, which times user information data is obtained, is measured instead of that obtained after iteration 4. Also, in the third embodiment, it may be possible to use the FER of decoding result obtained after iteration 8, which user information data is obtained, instead of that obtained after iteration 6.

Further, in the third embodiment, it may be possible to control the reference value H for the FER of decoding result obtained after iteration 6 using the FER of decoding result obtained after a larger iteration, with a longer time constant.

Furthermore, it may be possible to store or train the correction (control) result such as F and G for following communications.

Fourth Embodiment

A transmission/reception apparatus according to this embodiment has the same function block configuration as that illustrated in FIG. 12 except the function of the reference SIR control section. Reference SIR control section 305 in this embodiment controls two reference SIR values concurrently corresponding to two FER values respectively output from first and second FER measurement sections 303 and 304. Reference SIR control section 305 thus controls reference SIR values in two terms respectively corresponding to iteration 2 and iteration 4 and outputs the two reference SIR values respectively obtained after iteration 2 and iteration 4 to comparison section 306 for the transmission power control.

According to this embodiment, since the transmission power control is performed in first and second terms of which the time constants are different, it is possible to perform together the transmission power control with a short time constant, which has a relatively high error rate but high variation resistance, and the transmission power control with a longer time constant, which has low variation resistance but a relatively low error rate.

Further, it may be possible to perform together the transmission power control in three or more terms by providing three or more FER measurement sections each for measuring a data quality of decoding result obtained after respective predetermined iteration.

Fifth Embodiment

A transmission/reception apparatus according to this embodiment measures a momentary Signal to Interference Ratio to perform a short term transmission power control based on the measured value, while performing transmission power control in first and second terms by transmitting reference values respectively obtained after iteration 2 and iteration 4 in the same way as in the fourth embodiment.

According to this embodiment, since it is possible to perform together the short term transmission power control and the long term transmission power control based on a data quality corresponding to an intermediate iteration, it is possible to obtain both advantages of the long term transmission power control and the short term transmission power control.

Further, it may be possible to provide three or more FER measurement sections each for measuring a data quality obtained after a predetermined number of iterations to perform transmission power control in three or more terms.

As described above, according to the present invention, the decoding result after an certain number of iterations is output before the predetermined number of iterations is finished, which a desired communication quality of user information is achieved, and the FER of the output decoding result is measured. Therefore, even when a single kind of error correcting code such as the turbo code is used, it is possible to provide a transmission power control apparatus and transmission/reception apparatus capable of keeping a communication quality of user information stably without extending a time constant for the long term transmission power control.

The present invention is not limited to the above described embodiments, and various variations and modifications may be possible without departing from the scope of the present invention.

This application is based on the Japanese Patent Application No. HEI10-242284 filed on Aug. 27, 1998, entire content of which is expressly incorporated by reference herein.

What is claimed is:

1. A transmission power control apparatus comprising:
   an iterative decoder that iteratively decodes an error correcting code;
   a quality detector that detects a data quality using a decoding result obtained after a smaller number of iterations than a predetermined number of iterations needed to obtain user information with a desired level of accuracy; and
   a controller that performs a transmission power control based on the detected data quality.

2. The transmission power control apparatus according to claim 1, wherein said quality detector comprises:
   a first quality detector that detects a data quality after a first number of iterations; and
   a second quality detector that detects a data quality after a second number of iterations that is larger than the first number of iterations, and is smaller than the predetermined number of iterations needed to obtain user information with a desired level of accuracy, and
   said controller comprising:
   a first comparator that compares the data quality detected in said first quality detector to a first reference value;
   a second comparator that compares the data quality detected in said second quality detector to a second reference value; and
   a correcting device that adaptively corrects said first reference value based on the compared result in said second comparator.

3. The transmission power control apparatus according to claim 2, wherein said quality detector further comprises:
   a third quality detector that detects a data quality after a third number of iterations that is larger than the second number of iterations, and is smaller than the predetermined number of iterations needed to obtain user information with a desired level of accuracy, and
   said controller further comprises:
   a third comparator that compares the data quality detected in said third quality detector to a third comparator.

4. A transmission power control apparatus comprising:
   an iterative decoder that iteratively decodes an error correcting code;
   a first quality detector that detects a data quality after a first number of iterations and based on the detected data quality, performing a first term transmission power control; and a second quality detector that detects a data quality after a second number of iterations and based on the detected data quality, performing a second term transmission power control.

5. A transmission power control apparatus comprising:

an iterative decoder that iteratively decodes an error correcting code;

a ratio detector that detects a momentary signal interference ratio and based on the detected result, performing a first term transmission power control; and a quality detector that detects a data quality after a smaller number of iterations than a predetermined number of iterations needed to obtain user information with a desired level of accuracy, and based on the detected data quality, performing a second term transmission power control.

6. A transmission power control apparatus comprising:

an iterative decoder that iteratively decodes an error correcting code;

a ratio detector that detects a momentary signal interference ratio and based on the detected result, performing a first term transmission power control;

a first quality detector that detects a data quality after a first number of iterations which is smaller than a predetermined number of iterations needed to obtain user information with a desired level of accuracy, and based on the detected data quality, performing a second term transmission power control; and a second quality detector that detects a data quality after a second number of iterations which is larger than said first number of iterations, and based on the detected data quality, performing a third term transmission power control.

7. A base station apparatus having a transmission power control apparatus comprising:

an iterative decoder that decodes an error correcting code;

a quality detector that detects a data quality using a decoding result obtained after a smaller number of iterations than a predetermined number of iterations needed to obtain user information with a desired level of accuracy; and a controller that performs a transmission power control based on the detected data quality.

8. A mobile station apparatus having a transmission power control apparatus comprising:

an iterative decoder that iteratively decodes an error correcting code;

a quality detector that detects a data quality using a decoding result obtained after a smaller number of iterations than a predetermined number of iterations needed to obtain user information with a desired level of accuracy;

a controller that performs a transmission power control based on the detected data quality.

9. A transmission power control method comprising:

iterative decoding an error correcting code;

detecting a data quality using a decoding result obtained after a smaller number of iterations than a predetermined number of iterations needed to obtain user information with a desired level of accuracy; and performing a long term transmission power control based on the detected data quality.

10. A transmission power control method comprising:

iterative decoding an error correcting code;

detecting a data quality after a first number of iterations and based on the detected data quality, performing a first term transmission power control; and detecting a data quality after a second number of iterations and based on the detected data quality, performing a second term transmission power control.

* * * * *